United States Patent
Park et al.

(10) Patent No.: US 11,728,920 B2
(45) Date of Patent: Aug. 15, 2023

(54) OPTICAL COMMUNICATION SYSTEM AND METHOD OF MONITORING THEREOF

(71) Applicant: SOLiD, INC., Seongnam-si (KR)

(72) Inventors: Chi Young Park, Siheung-si (KR); Gil Koog Kim, Seoul (KR); Bum Soo Park, Seongnam-si (KR)

(73) Assignee: SOLiD, INC., Seongnam-si (KR)

( * ) Notice: Subject to any disclaimer, the term of this patent is extended or adjusted under 35 U.S.C. 154(b) by 0 days.

(21) Appl. No.: 17/869,058

(22) Filed: Jul. 20, 2022

(65) Prior Publication Data

US 2022/0360357 A1 Nov. 10, 2022

Related U.S. Application Data

(63) Continuation of application No. 17/097,621, filed on Nov. 13, 2020, now Pat. No. 11,418,277.

(30) Foreign Application Priority Data

| Nov. 15, 2019 | (KR) | ........................ 10-2019-0146498 |
| Nov. 13, 2020 | (KR) | ........................ 10-2020-0152297 |

(51) Int. Cl.
   *H04J 14/02* (2006.01)

(52) U.S. Cl.
   CPC ...... *H04J 14/0271* (2013.01); *H04J 14/0272* (2013.01); *H04J 14/0283* (2013.01)

(58) Field of Classification Search
   None
   See application file for complete search history.

(56) References Cited

U.S. PATENT DOCUMENTS

| 5,067,810 A | * | 11/1991 | Bu-Abbud | ......... G01M 11/3154 |
| | | | | 356/73.1 |
| 6,587,241 B1 | * | 7/2003 | Saleh | ................... H04B 10/032 |
| | | | | 398/92 |

(Continued)

FOREIGN PATENT DOCUMENTS

| KR | 10-2008-0097795 A | | 11/2008 | |
| KR | 2018005499 A | * | 1/2018 | ............ B60T 13/145 |

(Continued)

OTHER PUBLICATIONS

Extended European Search Report dated Apr. 13, 2021 in European Application No. 20207735.0.

(Continued)

*Primary Examiner* — Darren E Wolf
(74) *Attorney, Agent, or Firm* — Sughrue Mion, PLLC

(57) ABSTRACT

Provided is an optical communication system configured as an optical ring network including: a first optical communication device configured to transmit a first optical signal having a first wavelength in a first direction, and to transmit a second optical signal having a second wavelength in a second direction opposite to the first direction; and a second optical communication device configured to generate a first reflected signal by reflecting the first optical signal when the first optical signal is received, to generate a second reflected signal by reflecting the second optical signal when the second optical signal is received, and to transmit the first and second reflected signals to the first optical communication device, wherein the first optical communication device analyzes a connection state of the second optical communication device based on the first and second reflected signals.

6 Claims, 14 Drawing Sheets

(56) References Cited

U.S. PATENT DOCUMENTS

| | | | |
|---|---|---|---|
| 6,839,515 B1* | 1/2005 | Jahreis | H04B 10/0773 |
| | | | 398/16 |
| 2002/0105692 A1* | 8/2002 | Lauder | H04J 14/0208 |
| | | | 398/59 |
| 2005/0141892 A1 | 6/2005 | Park et al. | |
| 2005/0276603 A1 | 12/2005 | Jung et al. | |
| 2008/0137070 A1* | 6/2008 | Girard | G01B 11/002 |
| | | | 356/73 |
| 2012/0039254 A1* | 2/2012 | Stapleton | H04W 40/00 |
| | | | 370/328 |
| 2012/0063501 A1* | 3/2012 | Aguren | H04L 43/50 |
| | | | 375/224 |
| 2012/0273269 A1* | 11/2012 | Rinzler | G01M 11/35 |
| | | | 175/16 |
| 2016/0218802 A1* | 7/2016 | Ruchet | G01M 11/33 |
| 2018/0269648 A1* | 9/2018 | Robinson | H01S 3/10053 |

FOREIGN PATENT DOCUMENTS

| | | |
|---|---|---|
| KR | 10-2018-0054997 A | 5/2018 |
| KR | 10-2019-0001438 A | 1/2019 |
| WO | 2019/031656 A1 | 2/2019 |

OTHER PUBLICATIONS

Non-Final Office Action issued in parent U.S. Appl. No. 17/097,621 dated Jul. 8, 2021.
Final Office Action issued in parent U.S. Appl. No. 17/097,621 dated Oct. 28, 2021.
Notice of Allowance issued in parent U.S. Appl. No. 17/097,621 dated Apr. 6, 2022.

* cited by examiner

CASE 1

CASE 2

CASE 3

CASE 4

CASE 5

CASE 6

CASE 7

CASE 8

CASE 9

CASE 10

FIG. 14

| CASE | FIRST REFLECTION | SECOND REFLECTION | THIRD REFLECTION | FOURTH REFLECTION | CONTENTS |
|---|---|---|---|---|---|
| 1, 2 | O | O | O | O | FIRST RN: NORMAL<br>SECOND RN: NORMAL |
| 3 | O | X | O | X | FIRST RN: NORMAL<br>SECOND RN: ABSENT |
| 4 | X | O | X | O | FIRST RN: ABSENT<br>SECOND RN: NORMAL |
| 5, 6 | X | O | O | O | FIRST RN: DIRECTION ERROR<br>SECOND RN: NORMAL |
| 7, 8 | O | O | O | X | FIRST RN: NORMAL<br>SECOND RN: DIRECTION ERROR |
| 9, 10 | X | O | O | X | FIRST RN: DIRECTION ERROR<br>SECOND RN: DIRECTION ERROR |

OPTICAL COMMUNICATION SYSTEM AND METHOD OF MONITORING THEREOF

CROSS-REFERENCE TO RELATED APPLICATION

This application is a continuation of U.S. application Ser. No. 17/097,621 filed on Nov. 13, 2020, which claims the benefit of Korean Patent Application No. 10-2019-0146498, filed on Nov. 15, 2019, and Korean Patent Application No. 10-2020-0152297, filed on Nov. 13, 2020, in the Korean Intellectual Property Office, the disclosures of which are incorporated herein in its entirety by reference.

BACKGROUND

1. Field

The present disclosure relates to optical communication systems and methods of monitoring thereof.

2. Description of the Related Art

Due to the advent of various multimedia services based on the Internet and the web, large amounts of data traffic are increasing, and with the advent of smart phones and a rapid increase in demand for data services, the need to increase transmission capacity has emerged in optical communication networks applied to radio access networks for mobile communication.

As a result, as the number of devices constituting an optical communication network increases as well as the complexity of the network structure significantly increases, efficient management of the network and maintenance of the devices have begun to emerge as important factors. In particular, there is a need for a way to improve the quality of service by detecting errors in devices of optical communication networks to prevent failure and to respond quickly to failures.

SUMMARY

Provided are optical communication systems capable of efficiently monitoring connection states between optical communication devices constituting an optical communication system, and methods of monitoring the same.

Additional aspects will be set forth in part in the description which follows and, in part, will be apparent from the description, or may be learned by practice of the presented embodiments.

According to an aspect of the present disclosure, an optical communication system of an optical ring network, the optical communication includes a first optical signal-processing unit configured to output a first optical signal having a first wavelength; a first multiplexer/demultiplexer (MUX/DEMUX) configured to output the first optical signal in a first direction, and receiving and outputting a first reflected signal which is a reflected signal of the first optical signal; a second optical signal-processing unit configured to output a second optical signal of a second wavelength; a second MUX/DEMUX configured to output the second optical signal in a second direction opposite to the first direction, and receiving and outputting a second reflected signal which is a reflected signal of the second optical signal; and a controller configured to analyze a connection state of a first remote optical communication device to which the first and second optical signals are allocated, based on the first and second reflected signals.

According to an exemplary embodiment, the first remote optical communication device may be configured to reflect the first optical signal to generate the first reflected signal, to reflect the second optical signal to generate the second reflected signal, and to transmit the generated first and second reflected signals to the optical communication device, and may be configured to generate a corresponding reflected signal only when the first or second optical signal is received in a preset direction from among the first and second directions.

According to an exemplary embodiment, the controller may determine that a connection error of the first remote optical communication device has occurred when only one of the first and second reflected signals is received.

According to an exemplary embodiment, the optical communication system may further include a third optical signal-processing unit configured to output a third optical signal having a third wavelength to the first MUX/DEMUX; and a fourth optical signal-processing unit configured to output a fourth optical signal of a fourth wavelength to the second MUX/DEMUX, wherein the first MUX/DEMUX multiplexes the first optical signal and the third optical signal and outputs the first optical signal and the third optical signal in the first direction, and receives a third reflected signal which is a reflected signal of the third optical signal optical signal and outputs the third reflected signal to the controller, the second MUX/DEMUX multiplexes the second optical signal and the fourth optical signal and outputs the second optical signal and the fourth optical signal in the second direction, and receives a fourth reflected signal which is a reflected signal of the fourth optical signal and outputs the fourth reflected signal to the controller, and the controller analyzes a connection state of a second remote optical communication device to which the third and fourth optical signals are allocated, based on the third and fourth reflected signals.

According to an exemplary embodiment, the second remote optical communication device may be configured to reflect the third optical signal to generate the third reflected signal, to reflect the fourth optical signal to generate the fourth reflected signal, and to transmit the third and fourth reflected signals to the optical communication device, and may be configured to generate a corresponding reflected signal only when the third or fourth optical signal is received in a preset direction from among the first and second directions.

According to an exemplary embodiment, the controller may determine that a connection error of the second remote optical communication device has occurred when only one of the third and fourth reflected signals is received.

According to another aspect of the present disclosure, an optical communication system configured as an optical ring network, the optical communication system includes a first optical communication device configured to transmit a first optical signal having a first wavelength in a first direction, and to transmit a second optical signal having a second wavelength in a second direction opposite to the first direction; and a second optical communication device configured to generate a first reflected signal by reflecting the first optical signal when the first optical signal is received, to generate a second reflected signal by reflecting the second optical signal when the second optical signal is received, and to transmit the first and second reflected signals to the first optical communication device, wherein the first optical communication device analyzes a connection state of the second optical communication device based on the first and second reflected signals.

According to an exemplary embodiment, the second optical communication device may be configured to generate a corresponding reflected signal only when the first or second optical signal is received in a preset direction from among the first and second directions.

According to an exemplary embodiment, the first optical communication device may determine that a connection error of the second remote optical communication device has occurred when only one of the first and second reflected signals is received.

According to an exemplary embodiment, the first optical communication device may transmit a third optical signal having a third wavelength in the first direction, and transmit a fourth optical signal having a fourth wavelength in the second direction, and the first optical communication device may further include a third optical communication device configured to generate a third reflected signal by reflecting the third optical signal when the third optical signal is received, to generate a fourth reflected signal by reflecting the fourth optical signal when the fourth optical signal is received, and to transmit the third and fourth reflected signals to the first optical communication device, wherein the first optical communication device may analyze a connection state of the third optical communication device based on the third and fourth reflected signals.

According to an exemplary embodiment, the third optical communication device may be configured to generate a corresponding reflected signal only when the third or fourth optical signal is received in a preset direction from among the first and second directions.

According to an exemplary embodiment, the first optical communication device may determine that a connection error of the third remote optical communication device has occurred when only one of the third and fourth reflected signals is received.

According to the disclosure, there is an effect of efficiently monitoring connection states between optical communication devices.

Effects obtainable by the embodiments of the disclosure are not limited to the effects described above, and other effects not described herein may be clearly understood by one of ordinary skill in the art to which the inventive concept belongs from the following description.

BRIEF DESCRIPTION OF THE DRAWINGS

Embodiments of the disclosure will be more clearly understood from the following detailed description taken in conjunction with the accompanying drawings in which:

FIG. 14 is a view of a monitoring table according to an embodiment.

DETAILED DESCRIPTION

Figure 1:
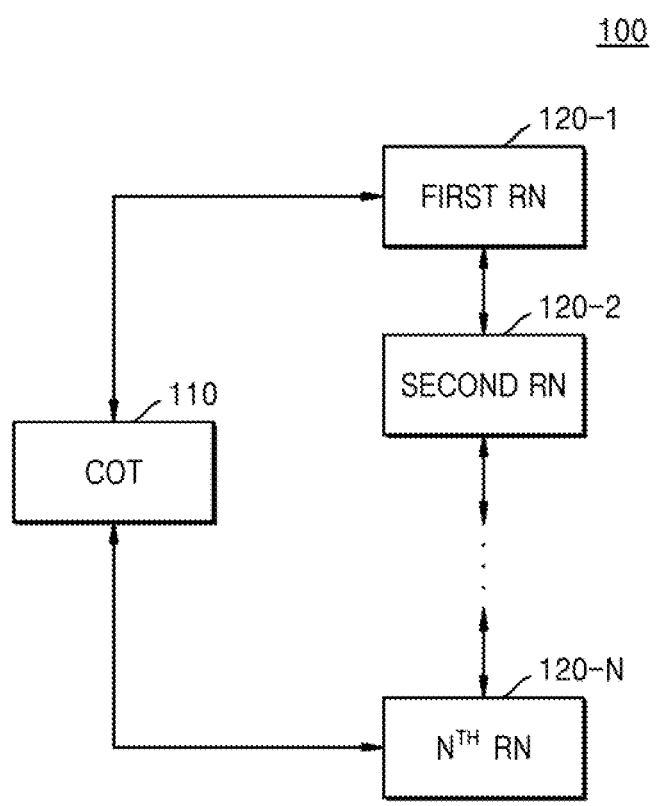
FIG. 1 is a configuration diagram of an optical communication system according to an embodiment.

Since the disclosure may have diverse modified embodiments, preferred embodiments are illustrated in the drawings and are described in the detailed description. However, this is not intended to limit the disclosure to particular modes of practice, and it is to be appreciated that all changes, equivalents, and substitutes that do not depart from the spirit and technical scope of the disclosure are encompassed in the disclosure.

In the description of the disclosure, certain detailed explanations of the related art are omitted when it is deemed that they may unnecessarily obscure the essence of the disclosure. In addition, numeral figures (e.g., first, second, and the like) used during describing the specification are just identification symbols for distinguishing one element from another element.

Further, in the specification, if it is described that one component "is connected to" or "accesses" the other component, it is understood that the one component may be directly connected to or may directly access the other component but unless explicitly described to the contrary, another component may be "connected" or "access" between the components.

In addition, terms including "unit," "er," "or," "module," and the like disclosed in the specification mean a unit that processes at least one function or operation and this may be implemented by hardware or software such as a processor, a micro processor, a micro controller, a central processing unit (CPU), a graphics processing unit (GPU), an accelerated Processing unit (APU), a digital signal processor (DSP), an application specific integrated circuit (ASIC), and a field programmable gate array (FPGA) or a combination of hardware and software.

In addition, it is intended to clarify that the division of the components in the specification is only made for each main function that each component is responsible for. That is, two or more components to be described later below may be combined into one component, or one components may be divided into two or more components according to more subdivided functions. In addition, it goes without saying that each of the components to be described later below may additionally perform some or all of the functions of other components in addition to its own main function, and some of the main functions that each of the components is responsible for may be dedicated and performed by other components.

Hereinafter, various embodiments of the disclosure will be described in detail in order.

FIG. 1 is a configuration diagram of an optical communication system according to an embodiment.

Referring to FIG. 1, an optical communication system 100 according to an embodiment may include a central office terminal (COT) 110 and n remote nodes (RNs) 120-1 to 120-n (n is a natural number). Hereinafter, an application example of configuring an optical transport network, which is a subnetwork in which the COT and the n RNs 120-1 to 120-n constitute a fronthaul segment of a radio access network architecture, will be described. However, the inventive concept of the disclosure is not limited thereto. It is apparent that the inventive concept of the disclosure may be applied to an optical transmission network such as midhaul and backhaul segments of the radio access network architecture, and further, an FTTx solution and an in-building solution.

The COT 110 and the n RNs 120-1 to 120-n may be configured as an optical ring network in which they are connected to each other in a ring topology structure.

The connection structure will be described in more detail on the assumption that the optical communication system 100 according to an embodiment is constituted of the COT 110 and two RNs 120-1 and 120-2. The COT 110 and the two RNs 120-1 and 120-2 may each include input/output ports for mutual connection. At this time, a first optical cable may be connected to a first input/output port of the COT 110, and a second optical cable may be connected to a second input/output port of the COT 110. Also, the first optical cable may be connected to a first input/output port of the first RN 120-1, and a third optical cable may be connected to a second input/output port of the first RN 120-1. In addition, the third optical cable may be connected to a first input/output port of the second RN 120-2, and the second optical cable may be connected to a second input/output port of the second RN 120-2. Here, the first to third optical cables may be a concept including not only a single optical cable but also a plurality of optical cables and their connection structures.

Meanwhile, among the two RNs and the COT that are connected to each other, the COT may be connected to a portion that performs digital processing of a base station in the fronthaul segment of the radio access network architecture, for example, at least one digital unit (DU) (or baseband unit (BBU)), and each RN may be connected to a portion that performs wireless processing of the base station, for example, at least one radio unit (RU) (or remote radio head (RRH)). However, the disclosure is not limited thereto, and among the two RNs and the COT that are connected to each other, the COT may be connected to at least one macro cell RU, and each RN may be connected to at least one small cell RU. According to various fronthaul topologies of the radio access network architecture, a connection object and an interconnection structure of each of the COT and RTs may vary.

The COT 110 may be a device that multiplexes base station signals and transmits the base station signals to one or more connected RNs (at least one of 120-1 to 120-n). For example, the COT 110 may receive a signal from a DU (not shown) and convert the signal into a WDM signal, and may transmit the WDM signal to one or more connected RNs (at least one of 120-1 to 120-n) through an optical cable. That is, the COT 110 may receive a plurality of base station signals and convert them into optical signals of different wavelengths, and may transmit the optical signals to one or more RNs (at least one of 120-1 to 120-n). The base station signal may be a baseband signal conforming to the standard of a fronthaul link such as Common Public Radio Interface (CPRI), Open Base Station Architecture Initiative (OBSAI), and Open Radio Equipment Interface (ORI).

In an example of FIG. 1, the COT 110 may transmit the WDM signal to the first RN 120-1 in one direction of the ring network, that is, through the first optical cable, and may transmit the WDM signal to the $n^{th}$ RN 120-n in the other direction of the ring network, that is, through the second optical cable.

Each of the RNs 120-1 to 120-n is a device located on a cell site side in a remote location. Each of the RNs 120-1 to 120-n is connected to the COT 110 and may transmit the WDM signal received from the COT 110 to at least one connected RU (not shown). That is, each of the RNs 120-1 to 120-n may be a passive WDM device. On the other hand, each RN may be replaced with a remote terminal (RT). Various remote devices may be used according to an optical transmission network field to which the optical communication system 100 is applied.

The COT 110 according to an embodiment may analyze connection states between the COT 110 and the first RN 120-1 and between the COT 110 and the second RN 120-2 by using monitoring optical signals having distinct wavelengths (i.e., channels) from optical signals corresponding to the base station signal. For example, the COT 110 may transmit the monitoring optical signals to the first RN 120-1 and/or the second RN 120-2, and may analyze a monitoring optical signal, which is reflected by the first RN 120-1 and/or the second RN 120-2 and returns, to analyze connection states between the COT 110 and the first RN 120-1 and between the COT 110 and the second RN 120-2.

Hereinafter, the operation of the COT 110 to analyze the connection states between the COT 110 and the first and second RNs 120-1 and 120-2 will be described in more detail.

Figure 2:
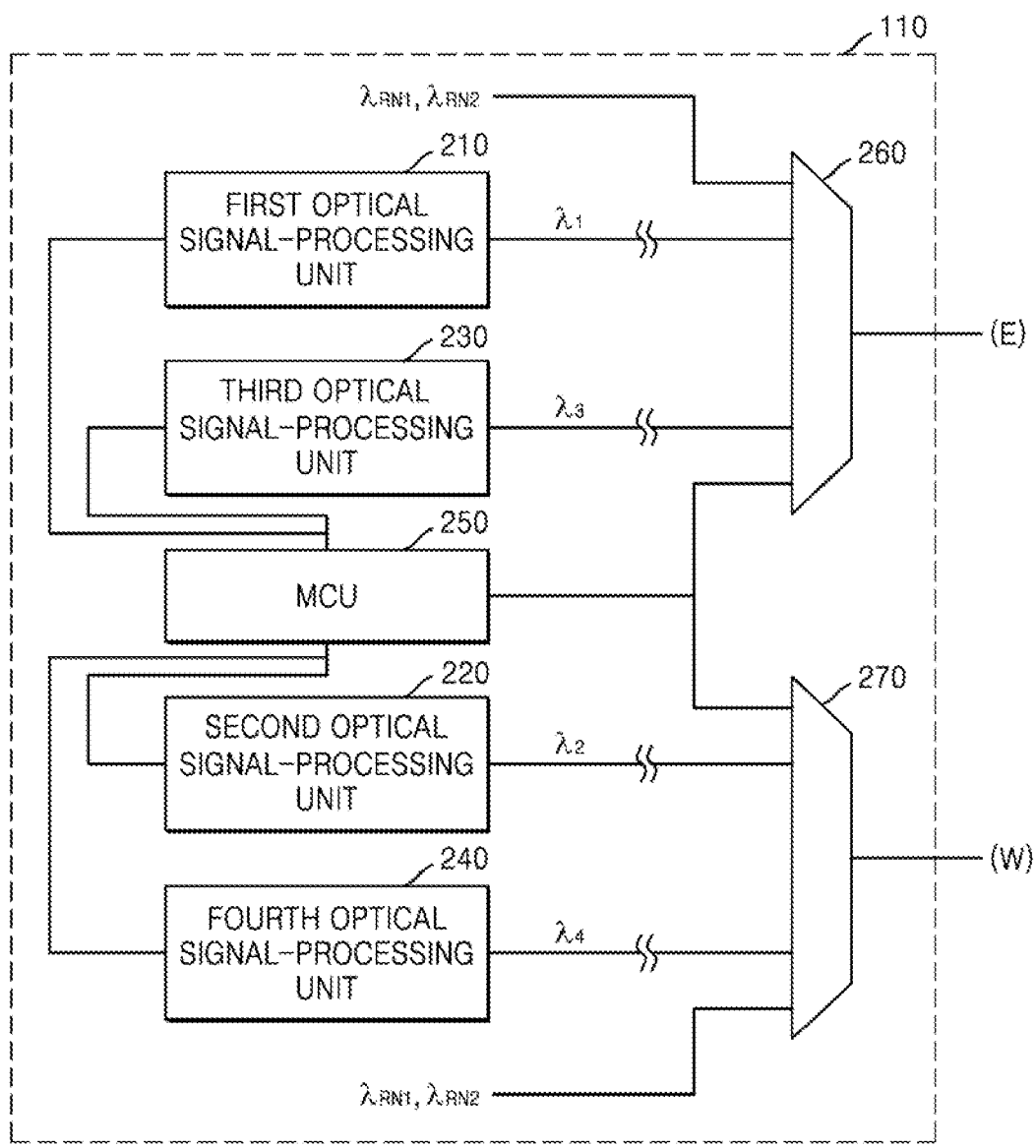
FIG. 2 is a block diagram of a central office terminal (COT) according to an embodiment.
Figure 3:
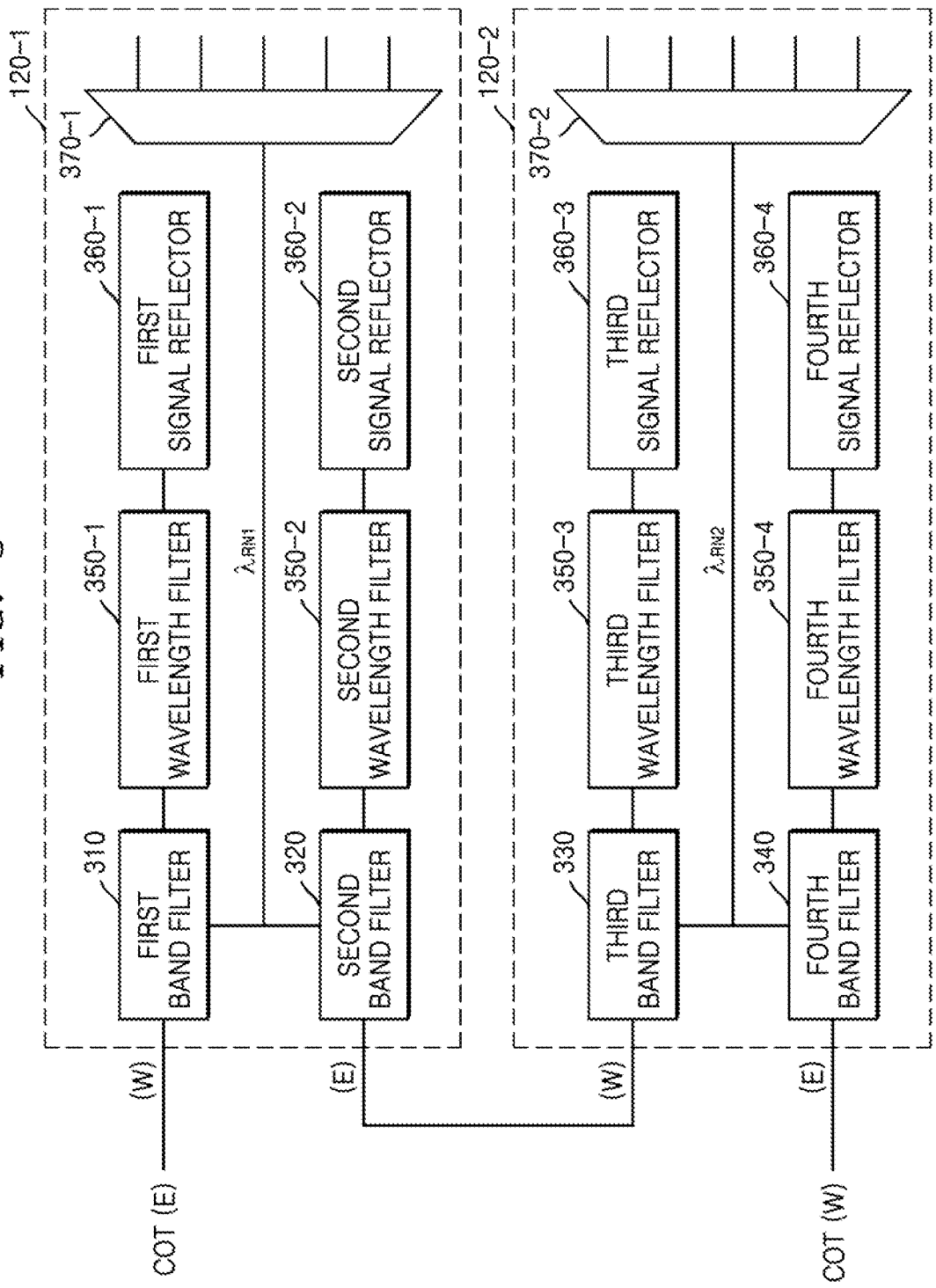
FIG. 3 is a block diagram of a remote node (RN) according to an embodiment.

FIG. 2 is a block diagram of a COT according to an embodiment, and FIG. 3 is a block diagram of an RN according to an embodiment. It is noted that FIGS. 2 and 3 show main components for monitoring from among configurations of the COT and the RN for convenience of explanation.

The COT 110 according to an embodiment may include first to fourth optical signal-processing units 210 to 240, a controller (MCU) 250, and a first multiplexer/demultiplexer (MUX/DEMUX) 260 and a second MUX/DEMUX 270. FIG. 2 illustrates an embodiment in which the COT 110 includes four optical signal-processing units and two MUX/DEMUXs, but the number of optical signal-processing units and MUX/DEMUXs may vary. For example, the number of optical signal-processing units may increase according to the number of RNs.

The first to fourth optical signal-processing units 210 to 240 may respectively generate monitoring optical signals under the control of the controller 250, and may output the generated optical signals to a corresponding MUX/DEMUX from among the first and second MUX/DEMUXs 260 and 270.

The first optical signal-processing unit 210 may generate a first optical signal having a first wavelength $\lambda 1$ and may output the first optical signal to the first MUX/DEMUX 260. The second optical signal-processing unit 220 may generate a second optical signal having a second wavelength $\lambda 2$ and may output the second optical signal to the second MUX/DEMUX 270. The third optical signal-processing unit 230 may generate a third optical signal having a third wavelength $\lambda 3$ and may output the third optical signal to the first MUX/DEMUX 260. The fourth optical signal-processing unit 240 may generate a fourth optical signal having a fourth wavelength $\lambda 4$ and may output the fourth optical signal to the second MUX/DEMUX 270.

The first to fourth wavelengths $\lambda 1$ to $\lambda 4$ may be different from wavelengths for transmission of base station signals. For example, the first to fourth wavelengths $\lambda 1$ to $\lambda 4$ may be different from a wavelength $\lambda RN1$ of a base station signal transmitted to the first RN 120-1 and a wavelength $\lambda RN2$ of a base station signal transmitted to the second RN 120-2. In other words, in FIG. 2 and hereinafter, for convenience of description, a wavelength of a base station signal allocated to the first RN 120-1 and a wavelength of a base station signal allocated to the second RN 120-2 are each illustrated, but the wavelength of the base station signal allocated to each of the first RN 120-1 and the second RN 120-2 may be plural.

The first wavelength $\lambda 1$ and the second wavelength $\lambda 2$, and the third wavelength $\lambda 3$ and the fourth wavelength $\lambda 4$ may be wavelengths of bands that are divided in the same band, respectively. For example, the first wavelength $\lambda 1$ may be a wavelength in an L band of 1310 nm, and the second wavelength $\lambda 2$ may be a wavelength in an H band of 1310 nm. In addition, the third wavelength $\lambda 3$ may be a wavelength in the L band of 1370 nm, and the fourth wavelength λ4 may be a wavelength in the H band of 1370 nm.

In addition, the first wavelength λ1 and the second wavelength λ2 may be monitoring wavelengths allocated to the first RN 120-1, and the third wavelength λ3 and the fourth wavelength λ4 may be monitoring wavelengths allocated to the second RN 120-2. Such monitoring wavelengths may be wavelengths of such as a supervisory channel.

Each of the first to fourth optical signal-processing units 210 to 240 may include an optical transceiver (e.g., an XFP, SFP, QSFP, or CFP type optical transceiver, etc.), a signal coupler (e.g., a coupler), and a filter in order to generate an optical signal of a wavelength set according to the control of the controller 250 and may output the optical signal to a corresponding MUX/DEMUX from among the first and second MUX/DEMUXs 260 and 270. In this case, the optical transceiver may be a wavelength tunable type optical transceiver, and may have a structure in which a transmission port and a reception port of the optical transceiver are connected to the signal coupler, the signal coupler is connected to the filter, and the filter is connected to a corresponding MUX/DEMUX.

Depending on the embodiment, the first to fourth optical signal-processing units 210 to 240 may be configured as filters for outputting an optical signal of a certain wavelength received from an external device to a corresponding MUX/DEMUX from among the first and second MUX/DEMUXs 260 and 270.

The first MUX/DEMUX 260 may multiplex service optical signals corresponding to base station signals for the first and second RNs 120-1 and 120-2 and the first optical signal and the third optical signal to output a first WDM signal through a connected first optical cable. Hereinafter, a direction in which an optical signal is transmitted through the first MUX/DEMUX 260 is referred to as "E" (EAST).

The second MUX/DEMUX 270 may multiplex the service optical signals corresponding to the base station signals for the first and second RNs 120-1 and 120-2 and the second optical signal and the fourth optical signal to output a second WDM signal through a connected second optical cable. Hereinafter, a direction in which an optical signal is transmitted through the second MUX/DEMUX 270 is referred to as "W" (WEST).

The first MUX/DEMUX 260 may output reflected signal(s) received through the first optical cable to the controller 250 after transmitting the first WDM signal. In addition, the second MUX/DEMUX 270 may output reflected signal(s) received through the second optical cable to the controller 250 after transmitting the second WDM signal.

The controller 250 may control overall operations of the first to fourth optical signal-processing units 210 to 240 and/or the COT 110 as described above, and may analyze the reflected signal(s) input from the first MUX/DEMUX 260 and/or the second MUX/DEMUX 270 to analyze connection states of one or more RNs 120-1 to 120-$n$ constituting the optical communication system 100.

Referring to FIG. 3, the first RN 120-1 may include a first band filter 310, a first wavelength filter 350-1, a first signal reflector 360-1, a second band filter 320, a second wavelength filter 350-2, a second signal reflector 360-2, and a first RN MUX/DEMUX 370-1. The second RN 120-2 may include a third band filter 330, a third wavelength filter 350-3, a third signal reflector 360-3, a fourth band filter 340, a fourth wavelength filter 350-4, a fourth signal reflector 360-4, and a second RN MUX/DEMUX 370-2.

As the first band filter 310 and the second band filter 320 of the first RN 120-1 are connected to each other, the third band filter 330 and the fourth band filter 340 of the second RN 120-2 are connected to each other, and the second band filter 320 and the third band filter 330 are connected to each other, the COT 110 and the first and second RNs 120-1 and 120-2 may have a ring topology structure capable of transmitting and receiving optical signals in both directions.

Although not shown, outputs of the first band filter 310 and the second band filter 320 in the first RN 120-1 may be connected to a signal coupler (e.g., a coupler), and the signal coupler may couple the outputs of the first band filter 310 and the second band filter 320 and may output them to the first RN MUX/DEMUX 370-1. Similarly, outputs of the third band filter 330 and the fourth band filter 340 in the second RN 120-2 may be connected to a signal coupler, and the signal coupler may couple the outputs of the third band filter 330 and the fourth band filter 340 and may output them to the second RN MUX/DEMUX 370-2.

The first band filter 310 may include a band pass filter (BPF) capable of filtering a band including the wavelength λRN1, the first wavelength λ1, and the second wavelength λ2 of the base station signal allocated to the first RN 120-1.

When the first WDM signal is received, the first band filter 310 may filter a service optical signal and the first optical signal allocated to the first RN 120-1 from the first WDM signal and may output the filtered service optical signal and first optical signal to the first wavelength filter 350-1 and the first RN MUX/DEMUX 370-1.

Alternatively, when the second WDM signal is received, the first band filter 310 may filter the service optical signal and the second optical signal allocated to the first RN 120-1 from the second WDM signal and may output the filtered service optical signal and second optical signal to the first wavelength filter 350-1 and the first RN MUX/DEMUX 370-1.

The first wavelength filter 350-1 may include a wavelength selection filter capable of filtering the first wavelength λ1 and the second wavelength λ2 bands. The first wavelength filter 350-1 may filter the first optical signal or the second optical signal from the output of the first band filter 310, and may output the filtered first optical signal or the second optical signal to the first signal reflector 360-1.

The first signal reflector 360-1 may reflect an optical signal output from the first wavelength filter 350-1 and may output the optical signal in the opposite direction. For example, the first signal reflector 360-1 may output a signal a signal obtained by reflecting the first optical signal (hereinafter referred to as a first reflected signal) or a signal obtained by reflecting the second optical signal (hereinafter referred to as a second reflected signal) to the first wavelength filter 350-1.

The first wavelength filter 350-1 may output the first reflected signal or the second reflected signal to the first band filter 310. The first band filter 310 may transmit the first reflected signal to the first MUX/DEMUX 260 of the COT 110 through a connected optical cable, and may transmit the second reflected signal to the second MUX/DEMUX 270 of the COT 110 through the second RN 120-2.

Like the first band filter 310, the second band filter 320 may include a BPF capable of filtering a band including the wavelength λRN1 of the base station signal allocated to the first RN 120-1, and the first wavelength λ1 and the second wavelength λ2.

When the second WDM signal is received, the second band filter 320 may filter the service optical signal and the second optical signal allocated to the first RN 120-1 from the second WDM signal and may output the filtered service optical signal and second optical signal to the second wavelength filter 350-2 and the first RN MUX/DEMUX 370-1.

Alternatively, when the first WDM signal is received, the second band filter 320 may filter a service optical signal and a first optical signal corresponding to the base station signal for the first RN 120-1 from the first WDM signal and may output the filtered service optical signal and first optical signal to the second wavelength filter 350-2 and the first RN MUX/DEMUX 370-1.

The second band filter 320 may output an unfiltered wavelength band to the first band filter 310 or the third band filter 330 of the second RN 120-2.

The second wavelength filter 350-2 may include a wavelength selection filter capable of filtering a band of the second wavelength λ2. The second wavelength filter 350-2 may filter the second optical signal from the output of the second band filter 320 and may output the filtered second optical signal to the second signal reflector 360-2.

The second signal reflector 360-2 may reflect the optical signal output from the second wavelength filter 350-2 and may output the optical signal in the opposite direction. That is, the second signal reflector 360-2 may output the second reflected signal to the second wavelength filter 350-2.

The second wavelength filter 350-2 may output the second reflected signal to the second band filter 320. The second band filter 320 may transmit the second reflected signal to the second MUX/DMX 270 of the COT 110 through a connected optical cable and the second RN 120-2.

As such, unlike the first wavelength filter 350-1, the second wavelength filter 350-2 may filter only a signal having a specific wavelength, that is, the second optical signal. Accordingly, when the second band filter 320 is connected to the first MUX/DEMUX 260 of the COT 110 through an optical cable to receive the first WDM signal without being connected to the second MUX/DMX 270 of the COT 110 through an optical cable and the second RN 120-2 to receive the second WDM signal, no reflected signal is generated by the second wavelength filter 350-2 and the second signal reflector 360-2. Based on these characteristics, the COT 110 may detect a change in a connection state of the first RN 120-1.

Meanwhile, the first RN MUX/DEMUX 370-1 may multiplex a service optical signal output from the first band filter 310 and/or the second band filter 320 and may transmit the multiplexed service optical signal to at least one connected RU (not shown). In this case, the first optical signal or the second optical signal may be filtered by the first RN MUX/DEMUX 370-1 and may not be transmitted to the RU.

The second RN 120-2 has a configuration corresponding to the above-described first RN 120-1 and may operate similarly.

In particular, the second RN 120-2 may be configured such that the fourth wavelength filter 350-4 filters a third optical signal and a fourth optical signal respectively corresponding to the third wavelength λ3 and the fourth wavelength λ4, and the third wavelength filter 350-3 filters only the third optical signal corresponding to the third wavelength λ3. When a connection state between the COT 110 and the second RN 120-2 is reversed, no reflected signal is generated in a specific direction.

In other words, when the third band filter 330 is connected to the second MUX/DEMUX 270 of the COT 110 through an optical cable to receive the second WDM signal without being connected to the first MUX/DMX 260 of the COT 110 through an optical cable and the first RN 120-1 to receive the first WDM signal, no reflected signal is generated by the third wavelength filter 350-2 and the third signal reflector 360-3. Based on these characteristics, the COT 110 may detect a change in the connection state between the COT 110 and the second RN 120-2.

The controller 250 may analyze connection states between the COT 110 and the first RN 120-1 and between the COT 110 and the second RN 120-2 by analyzing reflected signal(s) received from among the first to fourth reflected signals.

For example, the controller 250 may determine whether the first RN 120-1 is normally connected (e.g., a connection direction, etc.), the distance to the second RN 120-2, and the like by analyzing whether the first optical signal and/or the second optical signal are/is transmitted from the COT 110 in different directions, and then the corresponding first and/or second reflected signals are/is received, and the time until reception.

In addition, the controller 250 may determine whether the second RN 120-2 is normally connected (e.g., a connection direction, etc.), the distance to the second RN 120-2, and the like by analyzing whether the third optical signal and/or the fourth optical signal are/is transmitted from the COT 110 in different directions, and then the corresponding third and/or fourth reflected signals are/is received, and the time until reception.

Operations of analyzing connection states of the RNs 120-1 to 120-$n$ of the controller 250 will be described in detail with reference to FIGS. 4 to 14.

FIGS. 4 to 13 are views illustrating a first connection state (CASE 1) to a tenth connection state (CASE 10) of an optical communication system, and FIG. 14 is a view of a connection state monitoring table according to an embodiment.

Figure 4:
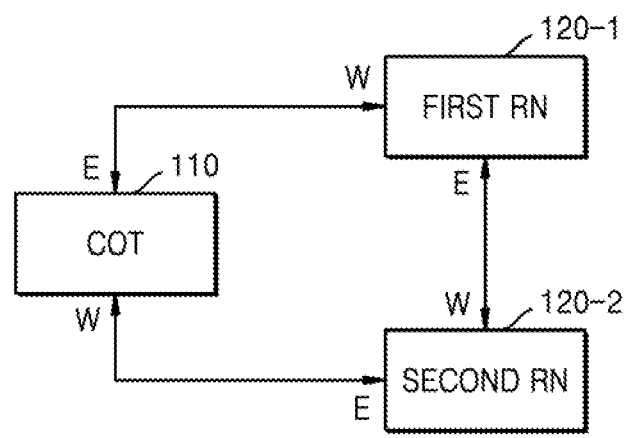
FIGS. 4 to 13 are views illustrating a first connection state (CASE 1) to a tenth connection state (CASE 10) of an optical communication system.

First, referring to FIG. 4, a case in which direction 'E' of the COT 110 is connected to direction 'W' of the first RN 120-1 and direction 'W' of the COT 110 is connected to direction 'E' of the second RN 120-2 is illustrated (CASE 1). In this case, the COT 110 and the first RN 120-1 may be connected to each other through a first optical cable, the COT 110 and the second RN 120-2 may be connected to each other through a second optical cable, and the first RN 120-1 and the second RN 120-2 may be connected to each other through a third optical cable.

As the first band filter 310 of the first RN 120-1 is connected to the first RN 120-1 in the direction 'W' as illustrated in FIG. 3, a first WDM signal may be input to the first band filter 310 of the first RN 120-1. In this case, a first reflected signal may be generated through the first band filter 310, the first wavelength filter 350-1, and the first signal reflector 360-1, and the generated first reflected signal may be output to the first band filter 310 and transmitted to the COT 110 through the first optical cable.

As the second band filter 320 of the first RN 120-1 is connected to the first RN 120-1 in the direction 'E' as illustrated in FIG. 3, a second WDM signal may be input to the second band filter 320 of the first RN 120-1. In this case, a second reflected signal may be generated through the second band filter 320, the second wavelength filter 350-2, and the second signal reflector 360-2, and the generated second reflected signal may be output to the second band filter 320. The second reflected signal may be transmitted to the COT 110 through a third optical cable, the second RN 120-2, and a second optical cable.

As the third band filter 330 of the second RN 120-2 is connected to the second RN 120-2 in the direction 'W' as illustrated in FIG. 3, the first WDM signal may be input to the third band filter 330 of the second RN 120-2. In this case, a third reflected signal may be generated through the third band filter 330, the third wavelength filter 350-3, and the third signal reflector 360-3, and the generated third reflected signal may be output to the third band filter 330. The third reflected signal may be transmitted to the COT 110 through the third optical cable, the first RN 120-1, and the first optical cable.

As the fourth band filter 340 of the second RN 120-2 is connected to the second RN 120-2 in the direction 'E' as illustrated in FIG. 3, the second WDM signal may be input to the fourth band filter 340 of the second RN 120-2. In this case, a fourth reflected signal may be generated through the fourth band filter 340, the fourth wavelength filter 350-4, and the fourth signal reflector 360-4, and the generated fourth reflected signal may be output to the fourth band filter 340 and transmitted to the COT 110 through the second optical cable.

The controller 250 may determine connection states of the first RN 120-1 and the second RN 120-2 by comparing a received reflected signal with a preset connection state monitoring table.

In the example shown in FIG. 4, the controller 250 may receive all of the first to fourth reflected signals, and in this case, may determine that both the first RN 120-1 and the second RN 120-2 are normally connected to the COT 110.

Figure 5:
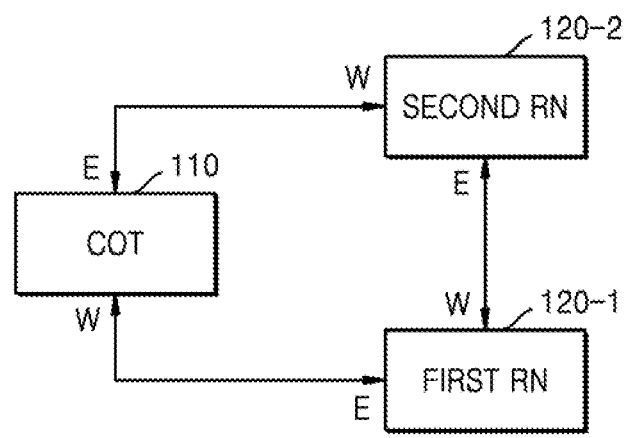

Referring to FIG. 5, a case in which the direction 'E' of the COT 110 is connected to the direction 'W' of the second RN 120-2 and the direction 'W' of the COT 110 is connected to the direction 'E' of the first RN 120-2 is illustrated (CASE 2). In this case, the COT 110 and the second RN 120-2 may be connected to each other through a first optical cable, the COT 110 and the first RN 120-1 may be connected to each other through a second optical cable, and the first RN 120-1 and the second RN 120-2 may be connected to each other through a third optical cable.

As the first band filter 310 of the first RN 120-1 is connected to the first RN 120-1 in the direction 'W' as illustrated in FIG. 3, the first WDM signal may be input to the first band filter 310 of the first RN 120-1. In this case, a first reflected signal may be generated through the first band filter 310, the first wavelength filter 350-1, and the first signal reflector 360-1, and the generated first reflected signal may be output to a third optical cable of the first band filter 310. The first reflected signal transmitted to the third optical cable may be transmitted to the COT 110 through the second RN 120-2 and the first optical cable.

As the second band filter 320 of the first RN 120-1 is connected to the first RN 120-1 in the direction 'E' as illustrated in FIG. 3, the second WDM signal may be input to the second band filter 320 of the first RN 120-1. In this case, a second reflected signal may be generated through the second band filter 320, the second wavelength filter 350-2, and the second signal reflector 360-2, and the generated second reflected signal may be transmitted to the COT 110 through the second optical cable of the second band filter 320.

As the third band filter 330 of the second RN 120-2 is connected to the second RN 120-2 in the direction 'W' as illustrated in FIG. 3, the first WDM signal may be input to the third band filter 330 of the second RN 120-2. In this case, a third reflected signal may be generated through the third band filter 330, the third wavelength filter 350-3, and the third signal reflector 360-3, and the generated third reflected signal may be transmitted to the COT 110 through the first optical cable of the third band filter 330.

As the fourth band filter 340 of the second RN 120-2 is connected to the second RN 120-2 in the direction 'E' as illustrated in FIG. 3, the second WDM signal may be input to the fourth band filter 340 of the second RN 120-2. In this case, a fourth reflected signal may be generated through the fourth band filter 340, the fourth wavelength filter 350-4, and the fourth signal reflector 360-4, and the generated fourth reflected signal may be output to a third optical cable of the fourth band filter 340. The fourth reflected signal output to the third optical cable may be transmitted to the COT 110 through the first RN 120-1 and the second optical cable.

Even in this case, the controller 250 may receive all of the first to fourth reflected signals, and may determine that the first RN 120-1 and the second RN 120-2 are normally connected to the COT 110.

Figure 6:
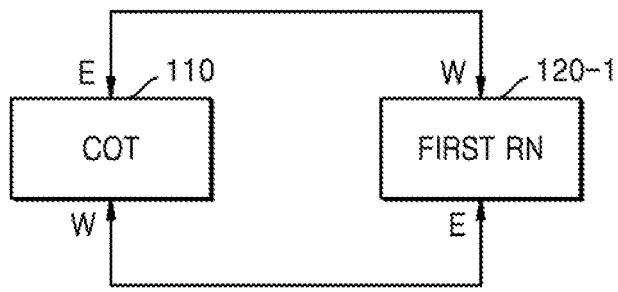

Referring to FIG. 6, a case in which the direction 'E' of the COT 110 is connected to the direction 'W' of the first RN 120-1 is illustrated (CASE 3). In this case, the COT 110 and the first RN 120-1 may be connected to each other through a first optical cable and a second optical cable, and the COT 110 and the second RN 120-2 are not connected to each other.

As the first band filter 310 of the first RN 120-1 is connected to the first RN 120-1 in the direction 'W' as illustrated in FIG. 3, when the first WDM signal is input to the first band filter 310 of the first RN 120-1, a first reflected signal may be generated and transmitted to the COT 110 through the first optical cable.

Also, as the second band filter 320 of the first RN 120-1 is connected to the first RN 120-1 in the direction 'E' as illustrated in FIG. 3, when the second WDM signal is input to the second band filter 320 of the first RN 120-1, a second reflected signal may be generated and transmitted to the COT 110 through the second optical cable.

In this case, the controller 250 may receive the first and second reflected signals, and may not receive the third and fourth reflected signals. Accordingly, the controller 250 may determine that the first RN 120-1 is normally connected to the COT 110 and the second RN 120-2 does not exist.

Figure 7:
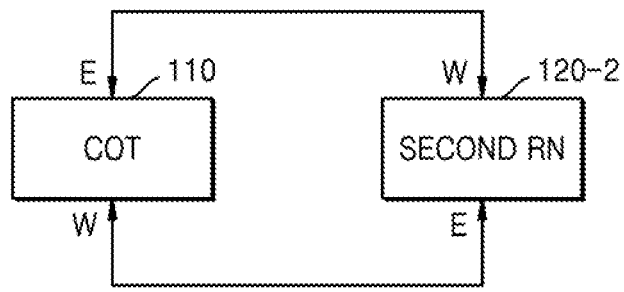

Referring to FIG. 7, a case in which the direction 'E' of the COT 110 is connected to the direction 'W' of the second RN 120-2 is illustrated (CASE 4). In this case, the COT 110 and the second RN 120-2 may be connected to each other through a first optical cable and a second optical cable, and the COT 110 and the first RN 120-1 are not connected to each other.

As the third band filter 330 of the second RN 120-2 is connected in the direction 'W' of the second RN 120-2 as illustrated in FIG. 3, when the first WDM signal is input to the third band filter 330 of the second RN 120-2, a third reflected signal may be generated and transmitted to the COT 110 through the first optical cable.

Also, as the fourth band filter 340 of the second RN 120-2 is connected to the second RN 120-2 in the direction 'E', when the second WDM signal is input to the fourth band filter 340 of the second RN 120-2, a fourth reflected signal may be generated and transmitted to the COT 110 through the second optical cable.

In this case, the controller 250 may receive the third and fourth reflected signals, and may not receive the first and second reflected signals. Accordingly, the controller 250 may determine that the second RN 120-2 is normally connected to the COT 110 and the first RN 120-1 does not exist.

Figure 8:
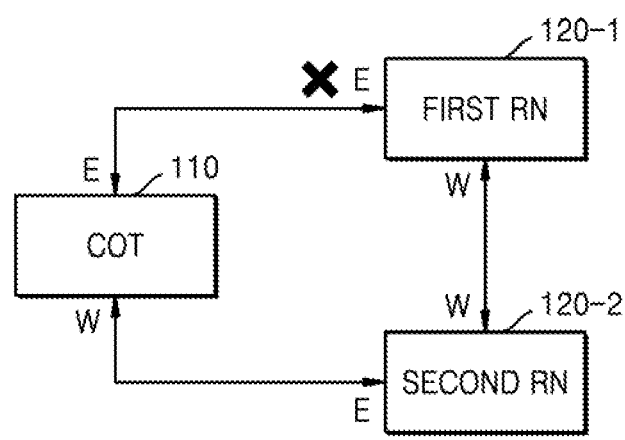

Referring to FIG. 8, a case in which the direction 'E' of the COT 110 is connected to the direction 'W' of the first RN 120-1 and the direction 'W' of the COT 110 is connected to the direction 'E' of the second RN 120-2 is illustrated (CASE 5). In this case, the COT 110 and the first RN 120-1 may be connected to each other through a first optical cable, the COT 110 and the second RN 120-2 may be connected to each other through a second optical cable, and the first RN 120-1 and the second RN 120-2 may be connected to each other through a third optical cable.

As the second band filter 320 of the first RN 120-1 is connected to the first RN 120-1 in the direction 'E', when the first WDM signal is input to the second band filter 320 of the first RN 120-1, no reflected signal is generated. In a case of the second wavelength filter 350-2 at the rear end of the second band filter 320, only a second optical signal may be filtered, so that a first or third optical signal of the first WDM signal cannot be filtered. Accordingly, no reflected signal is generated.

Meanwhile, as the first band filter 310 of the first RN 120-1 is connected to the first RN 120-1 in the direction 'W', when the second WDM signal is input to the first band filter 310 of the first RN 120-1, a second reflected signal may be generated by the first wavelength filter 350-1 at the rear end of the first band filter 310 and the first signal reflector 360-1. This is because the first wavelength filter 350-1 may selectively filter the first or second optical signal. The generated second reflected signal may be transmitted to the COT 110 through the third optical cable, the second RN 120-2, and the second optical cable.

As described with reference to FIG. 4, as the third band filter 330 of the second RN 120-2 is connected to the second RN 120-2 in the direction 'W' and the fourth band filter 340 is connected to the second RN 120-2 in the direction 'E', a third reflected signal and a fourth reflected signal may be generated and transmitted to the COT 110.

Accordingly, the controller 250 will not be able to receive only the first reflected signal from among the first to fourth reflected signals. In this case, the controller 250 may determine that there is an error in the connection direction of the first RN 120-1 and the second RN 120-2 is normally connected to the COT 110.

Figure 9:
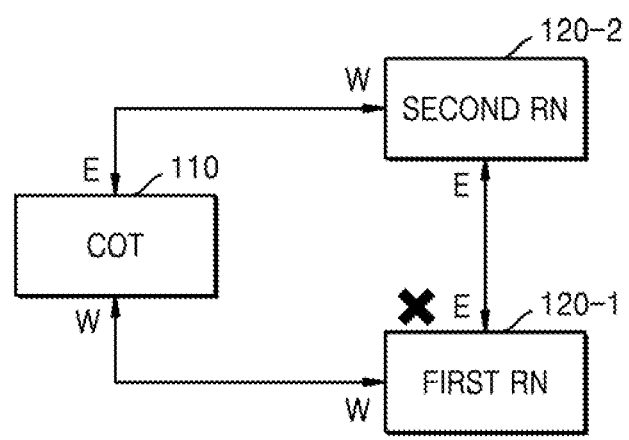

Referring to FIG. 9, a case in which the direction 'E' of the COT 110 is connected to the direction 'W' of the second RN 120-2, and the direction 'W' of the COT 110 is connected to the direction 'W' of the first RN 120-2 (CASE 6) is illustrated.

In this case, because only a connection order of the first RN 120-1 and the second RN 120-2 is changed in the example of FIG. 8, the controller 250 will not be able to receive only the first reflected signal from among the first to fourth reflected signals. Accordingly, the controller 250 may determine that there is an error in the connection direction of the first RN 120-1 and the second RN 120-2 is normally connected to the COT 110.

Figure 10:
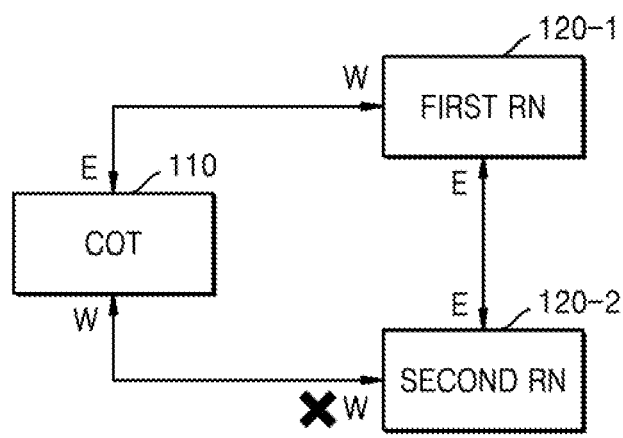

Referring to FIG. 10, a case in which the direction 'E' of the COT 110 is connected to the direction 'W' of the first RN 120-1 and the direction 'W' of the COT 110 is connected to the direction 'E' of the second RN 120-2 is illustrated (CASE 7). In this case, the COT 110 and the first RN 120-1 may be connected to each other through a first optical cable, and the COT 110 and the second RN 120-2 may be connected to each other through a second optical cable.

As described with reference to FIG. 4, as the first band filter 310 of the first RN 120-1 is connected to the first RN 120-1 in the direction 'W' and the second band filter 320 is connected to the first RN 120-1 in the direction 'E', a first reflected signal and a second reflected signal may be generated and transmitted to the COT 11.

As the third band filter 330 of the second RN 120-2 is connected to the second RN 120-2 in the direction 'E', when the second WDM signal is input to the third band filter 320, no reflected signal is generated. In a case of the third wavelength filter 350-3 at the rear end of the third band filter 330, only a third optical signal may be filtered, so that a second or fourth optical signal of the second WDM signal cannot be filtered. Accordingly, no reflected signal is generated.

Meanwhile, as the fourth band filter 340 of the second RN 120-2 is connected to the second RN 120-2 in the direction 'W', when the first WDM signal is input to the fourth band filter 340, a third reflected signal may be generated by the fourth wavelength filter 350-4 at the rear end of the fourth band filter 340 and the fourth signal reflector 360-4. This is because the fourth wavelength filter 350-4 may selectively filter the third or fourth optical signal. The generated third reflected signal may be transmitted to the COT 110 through the third optical cable, the first RN 120-1, and the first optical cable.

As such, the controller 250 cannot receive only the fourth reflected signal from among the first to fourth reflected signals. Accordingly, the controller 250 may determine that the first RN 120-1 is normally connected to the COT 110 and only the second RN 120-2 has a connection direction error.

Figure 11:
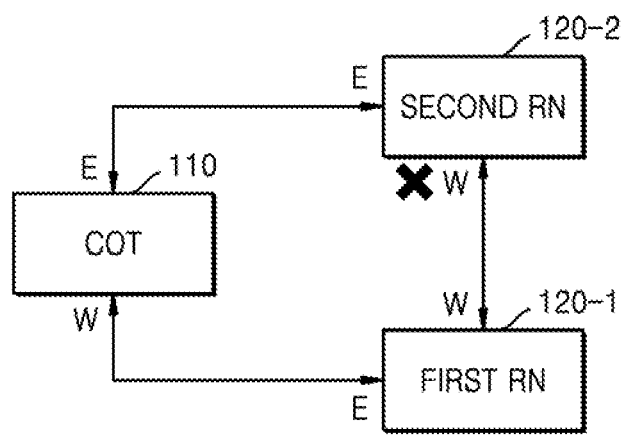

Referring to FIG. 11, a case in which the direction 'E' of the COT 110 is connected to the direction 'W' of the second RN 120-2, and the direction 'W' of the COT 110 is connected to the direction 'E' of the first RN 120-1 (CASE 8) is illustrated.

In this case, because only a connection order of the first RN 120-1 and the second RN 120-2 is changed in the example of FIG. 10, the controller 250 will not be able to receive only the fourth reflected signal from among the first to fourth reflected signals even in this example. Accordingly, the controller 250 may determine that the first RN 120-1 is normally connected to the COT 110 and only the second RN 120-2 has a connection direction error.

Figure 12:
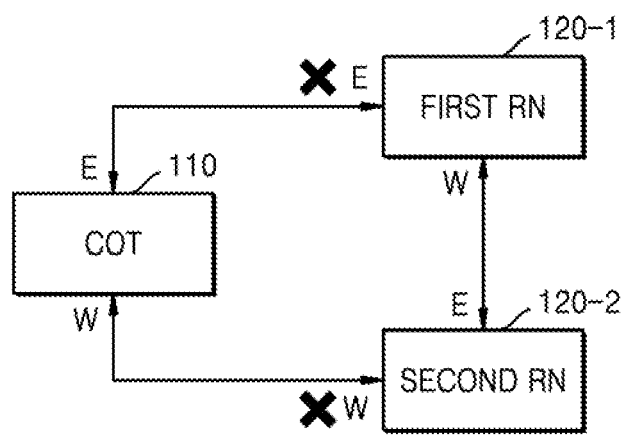

Referring to FIG. 12, a case in which the direction 'E' of the COT 110 is connected to the direction 'E' of the first RN 120-1, and the direction 'W' of the COT 110 is connected to the direction 'W' of the second RN 120-2 (CASE 9) is illustrated.

In this example, as in the embodiments described with reference to FIGS. 8 and 10, connection directions of the first RN 120-1 and the second RN 120-2 are all reversed. Accordingly, the first and fourth reflection signals may not be generated, but only the second and third reflection signals may be generated.

Accordingly, the controller 250 may determine that both the first RN 120-1 and the second RN 120-2 have a connection direction error.

Figure 13:
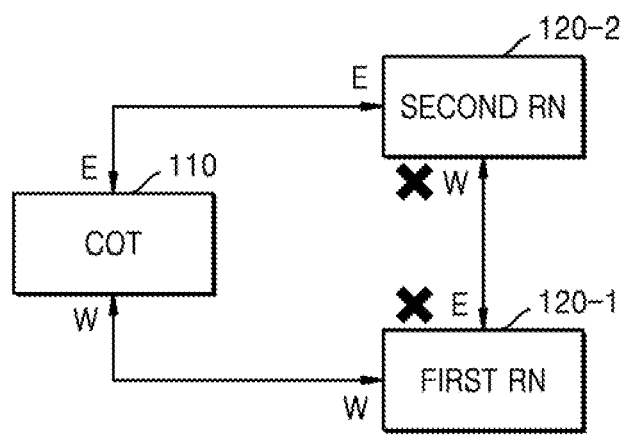

Referring to FIG. 13, a case in which the direction 'E' of the COT 110 is connected to the direction 'E' of the second RN 120-2, and the direction 'W' of the COT 110 is connected to the direction 'W' of the first RN 120-2 (CASE 10) is illustrated.

In this case, because only a connection order of the first RN 120-1 and the second RN 120-2 is changed in the example of FIG. 12, the controller 250 will be able to receive only the second and third reflected signals from among the first to fourth reflected signals even in this example. Accordingly, the controller 250 may determine that both the first RN 120-1 and the second RN 120-2 have a connection direction error.

A monitoring table in which results for CASE 1 to CASE 10 described above are arranged in advance (see FIG. 14) may be stored in advance in a storage space (not shown) provided in the controller 250. The controller 250 may monitor connection states of the RN(s) 120-1 to 120-n connected to the COT 110 by comparing the received reflected signal(s) with the monitoring table.

Accordingly, according to the disclosure, connection states between optical communication devices (i.e., the COT 110 and the RNs 120-1 to 120-n) may be effectively monitored from a remote location without an administrator's on-site visit.

While the embodiments have been particularly shown and described, it will be understood by one of ordinary skill in the art that various changes in form and details may be made therein without departing from the spirit and scope of the disclosure as defined by the appended claims.

The invention claimed is:

1. An optical communication device of an optical ring network, the optical communication device comprising:
    a first optical signal-processor configured to output a first optical signal having a first wavelength;
    a first multiplexer/demultiplexer (MUX/DEMUX) configured to output the first optical signal in a first direction, and receiving and outputting a first reflected signal which is a reflected signal of the first optical signal;
    a second optical signal-processor configured to output a second optical signal of a second wavelength;
    a second MUX/DEMUX configured to output the second optical signal in a second direction opposite to the first direction, and receiving and outputting a second reflected signal which is a reflected signal of the second optical signal; and
    a controller configured to analyze a connection state of a first remote optical communication device to which the first and second optical signals are allocated, based on the first and second reflected signals.

2. The optical communication device of claim 1, wherein:
    the first reflected signal is generated by the first remote optical communication device when the first optical signal is received in a preset direction, and
    the second reflected signal is generated by the first remote optical communication device when the second optical signal is received in a preset direction.

3. The optical communication device of claim 2, wherein the controller determines that a connection error of the first remote optical communication device has occurred when at least one of the first or second reflected signals is not received.

4. The optical communication device of claim 1, further comprising:
    a third optical signal-processor configured to output a third optical signal having a third wavelength to the first MUX/DEMUX; and
    a fourth optical signal-processor configured to output a fourth optical signal of a fourth wavelength to the second MUX/DEMUX,
    wherein the first MUX/DEMUX multiplexes the first optical signal and the third optical signal and outputs the first optical signal and the third optical signal in the first direction, and receives a third reflected signal which is a reflected signal of the third optical signal and outputs the third reflected signal to the controller,
    the second MUX/DEMUX multiplexes the second optical signal and the fourth optical signal and outputs the second optical signal and the fourth optical signal in the second direction, and receives a fourth reflected signal which is a reflected signal of the fourth optical signal and outputs the fourth reflected signal to the controller, and
    the controller analyzes a connection state of a second remote optical communication device to which the third and fourth optical signals are allocated, based on the third and fourth reflected signals.

5. The optical communication device of claim 4, wherein:
    the third reflected signal is generated by the second remote optical communication device when the third optical signal is received in a preset direction, and
    the fourth reflected signal is generated by the second remote optical communication device when the fourth optical signal is received in a preset direction.

6. The optical communication device of claim 5, wherein the controller determines that a connection error of the second remote optical communication device has occurred when at least one of the third or fourth reflected signals is not received.

* * * * *